United States Patent
Park et al.

(10) Patent No.: US 11,457,124 B2
(45) Date of Patent: Sep. 27, 2022

(54) REDACTION OF PERSONAL INFORMATION IN DOCUMENT

(71) Applicant: Hewlett-Packard Development Company, L.P., Spring, TX (US)

(72) Inventors: Incheon Park, Seongnam-si (KR); Jaein Lee, Seongnam-si (KR); Daehyun Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/282,114

(22) PCT Filed: Sep. 26, 2019

(86) PCT No.: PCT/US2019/053066
§ 371 (c)(1),
(2) Date: Apr. 1, 2021

(87) PCT Pub. No.: WO2020/219094
PCT Pub. Date: Oct. 29, 2020

(65) Prior Publication Data
US 2021/0377423 A1 Dec. 2, 2021

(30) Foreign Application Priority Data

Apr. 24, 2019 (KR) .......................... 10-2019-0047988

(51) Int. Cl.
*H04N 1/44* (2006.01)
*G06F 21/62* (2013.01)
(Continued)

(52) U.S. Cl.
CPC ......... *H04N 1/448* (2013.01); *G06F 21/6245* (2013.01); *G06V 30/40* (2022.01);
(Continued)

(58) Field of Classification Search
CPC .. H04N 1/448; H04N 1/0044; H04N 1/32101; H04N 1/3872; G06F 21/6245; G06K 9/00442; G06K 2209/01
See application file for complete search history.

(56) References Cited

U.S. PATENT DOCUMENTS 8,584,005 B1    11/2013  Pittenger et al.
2007/0030528 A1* 2/2007  Quaeler ................. G06F 16/33
                                              358/448
(Continued)

FOREIGN PATENT DOCUMENTS

JP    2001-14411 A    1/2001
JP    2017-85243 A    5/2017
(Continued)

*Primary Examiner* — King Y Poon
*Assistant Examiner* — Michael L Burleson
(74) *Attorney, Agent, or Firm* — Jefferson IP Law, LLP

(57) ABSTRACT

An example image forming apparatus includes a user interface device, an image forming job operator, a processor, and a memory. The processor executes instructions to perform a redaction process of redacting personal information displayed on a preview screen of a document through the user interface device of the image forming apparatus and included in the document, show display state information of the personal information, in synchronization with a progress of the redaction process, and control the image forming job operator to perform an image forming job with respect to the document in which the personal information is redacted when the redaction process is completed.

16 Claims, 12 Drawing Sheets

(51) Int. Cl.
*H04N 1/00* (2006.01)
*G06V 30/40* (2022.01)
*G06V 30/10* (2022.01)

(52) U.S. Cl.
CPC ....... *H04N 1/0044* (2013.01); *H04N 1/00413* (2013.01); *G06V 30/10* (2022.01)

(56) References Cited

U.S. PATENT DOCUMENTS

| | | |
|---|---|---|
| 2008/0165390 A1 | 7/2008 | Kim |
| 2009/0044254 A1 | 2/2009 | Tian |
| 2010/0033753 A1 | 2/2010 | Stephenson |
| 2014/0188921 A1* | 7/2014 | Thomason .......... G06F 21/6245 |
| | | 707/758 |
| 2014/0268244 A1* | 9/2014 | Sheridan ............... G06Q 10/10 |
| | | 358/403 |
| 2015/0110504 A1* | 4/2015 | Lee .......................... H04N 1/44 |
| | | 399/12 |
| 2016/0307063 A1* | 10/2016 | Bright .................... G16H 30/20 |
| 2018/0288280 A1 | 10/2018 | Bermundo et al. |
| 2018/0324312 A1 | 11/2018 | Wynn et al. |

FOREIGN PATENT DOCUMENTS

| | | |
|---|---|---|
| KR | 10-2014-0140876 A | 12/2014 |
| KR | 10-2018-0124529 A | 11/2018 |

* cited by examiner

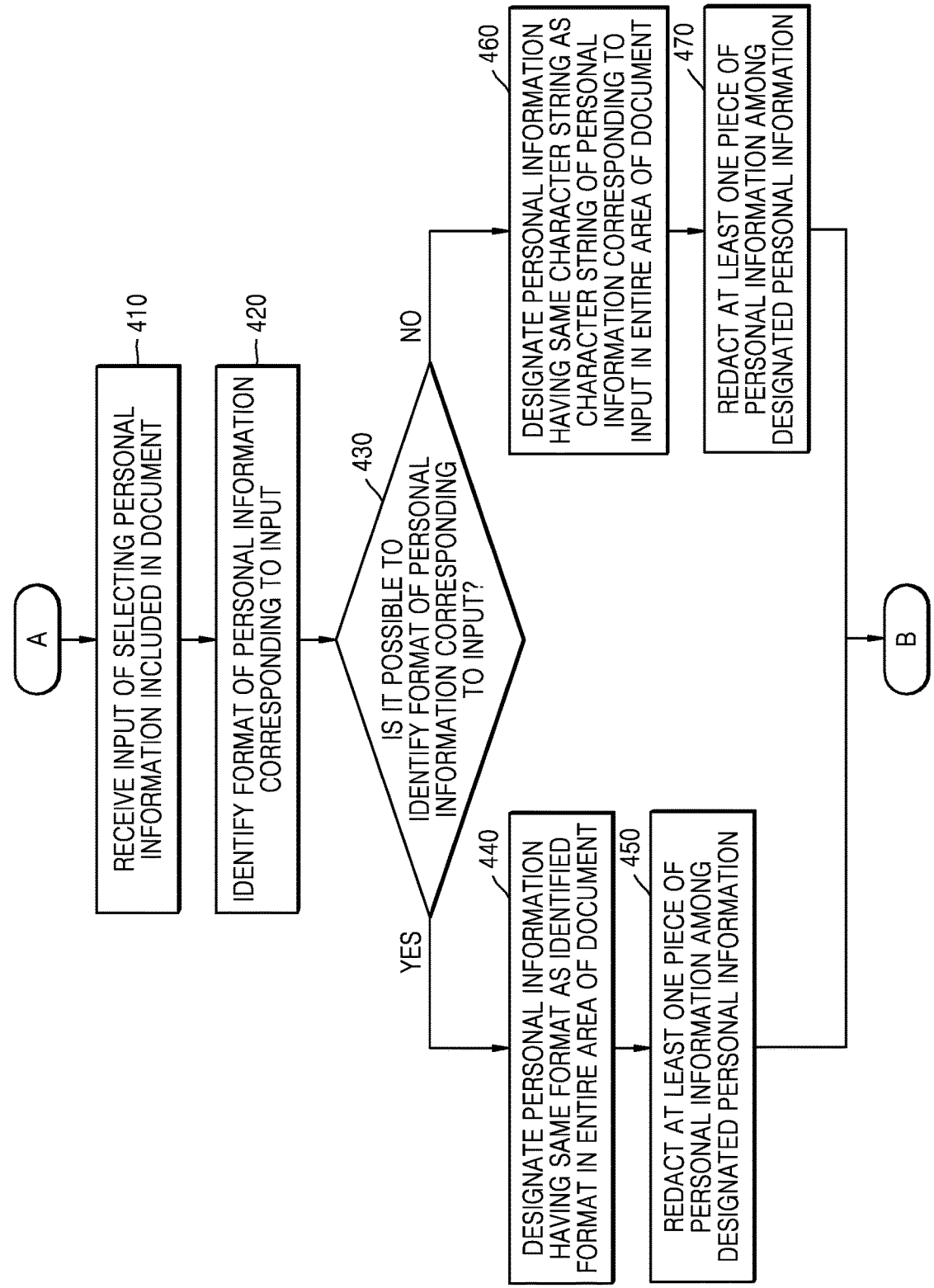

FIG. 5

↶ Scan to Email

- Total (8) Redaction (0) Remains (8)
  Name(3), Social Security Number(3), Phone(1), Address(1)

DISPLAY STATE INFORMATION OF PERSONAL INFORMATION

| NAME | SOCIAL SECURITY NUMBER(FOREIGN REGISTRATION NUMBER) | | MOBILE PHONE NUMBER | 010-1234-5678 |
|---|---|---|---|---|
| Joy | | | HOME NUMBER | |
| STREET NAME ADDRESS (RESIDENTIAL ADDRESS) | Seoul 201 | | 231234-3045 | |
| RELATIONSHIP WITH HEAD OF HOUSEHOLD | NAME | SOCIAL SECURITY NUMBER(FOREIGN REGISTRATION NUMBER) | WHETHER OR NOT HOUSEHOLD IS SHARED | ADDRESS WRITE DOWN ADDRESS ONLY WHEN HOUSEHOLDS ARE DIFFERENT |
| SELF | Grace | 123456-1098765 | [ ] YES [ ] NO | |
| SPOUSE | | | [ ] YES [ ] NO | |
| PERSON | Love | 654321-2012345 | [ ] YES [ ] NO | |
| PERSON | | | [ ] YES [ ] NO | |
| PERSON | | | [ ] YES [ ] NO | |

Options

✕  ◇ Send

PREVIEW SCREEN

FIG. 7

↶ Scan to Email

- Total (8) Redaction (1) Remains (7)
  Name(3), Social Security Number(3), Phone(1), Address(1)

DISPLAY STATE INFORMATION OF PERSONAL INFORMATION

MANAGEMENT MENU FOR PERSONAL INFORMATION
- Redact
- Redact Same Type
- Redact All
- Adjust
- Delete
- Delete Same Type
- Delete All

| NAME | SOCIAL SECURITY NUMBER (FOREIGN REGISTRATION NUMBER) | MOBILE PHONE NUMBER | 010-1234-5678 |
|---|---|---|---|
| ××××Joy×××× Seoul 201 | | HOME NUMBER | REDACTED PERSONAL INFORMATION |

| STREET NAME ADDRESS (RESIDENTIAL ADDRESS) | | | ADDRESS | WRITE DOWN ADDRESS ONLY WHEN HOUSEHOLDS ARE DIFFERENT |
|---|---|---|---|---|

| RELATIONSHIP WITH HEAD OF HOUSEHOLD | NAME | SOCIAL SECURITY NUMBER (FOREIGN REGISTRATION NUMBER) | WHETHER OR NOT HOUSEHOLD IS SHARED | |
|---|---|---|---|---|
| SELF | ××××Grace×××× | 123456-1098765 | [ ] YES [ ] NO | |
| SPOUSE | | | [ ] YES [ ] NO | |
| PERSON | ××××Love×××× | 654321-2012345 | [ ] YES [ ] NO | |
| PERSON | | | [ ] YES [ ] NO | |
| PERSON | | | [ ] YES [ ] NO | |

Options    ×    ◇ Send

PREVIEW SCREEN

FIG. 8

PREVIEW SCREEN

↶ Scan to Email

- Total (8) Redaction (1) Remains (7)
  Name(3), Social Security Number(3), Phone(1), Address(1)

DISPLAY STATE INFORMATION OF PERSONAL INFORMATION

MANAGEMENT MENU FOR PERSONAL INFORMATION

| Redact |
|---|
| Redact Same Type |
| Redact All |
| Adjust |
| Delete |
| Delete Same Type |
| Delete All |

| NAME | SOCIAL SECURITY NUMBER (FOREIGN REGISTRATION NUMBER) | MOBILE PHONE NUMBER | 010-1234-5678 |
|---|---|---|---|
| Joy | | HOME NUMBER | |
| STREET NAME ADDRESS (RESIDENTIAL ADDRESS) | Seoul 201 | ADDRESS | |
| | | WRITE DOWN ADDRESS ONLY WHEN HOUSEHOLDS ARE DIFFERENT | |

| RELATIONSHIP WITH HEAD OF HOUSEHOLD | NAME | SOCIAL SECURITY NUMBER (FOREIGN REGISTRATION NUMBER) | WHETHER OR NOT HOUSEHOLD IS SHARED |
|---|---|---|---|
| SELF | Grace | 123456-1098765 | 231234 |
| SPOUSE | | | [ ] YES [ ] NO |
| PERSON | Love | 654321-2012345 | [ ] YES [ ] NO |
| PERSON | | | [ ] YES [ ] NO |
| PERSON | | | [ ] YES [ ] NO |
| | | | [ ] YES [ ] NO |

Options  ◇ Send

REDACTION OF PERSONAL INFORMATION IN DOCUMENT

BACKGROUND

A user interface device included in an image forming apparatus such as a printer, a photocopier, a fax machine, a multifunctional machine, or the like has been provided in various forms to enhance a user convenience. A user interface device of an image forming apparatus is being developed to provide a convenient and user-friendly user interface (UI) or user experience (UX) to a user.

BRIEF DESCRIPTION OF DRAWINGS

FIG. 4 is a flowchart illustrating an operation in which an image forming apparatus performs a redaction process of redacting personal information included in a document, according to an example;

FIG. 5 is a diagram of a user interface screen to receive, from a user, an input selecting personal information included in a document and to show personal information designated in the document, according to an example;

FIG. 7 is a diagram of a user interface screen in which personal information included in a document is redacted, according to an example;

FIG. 8 is a diagram of a user interface screen in which redacted personal information is edited, according to an example;

DETAILED DESCRIPTION OF EXAMPLES

Figure 1:
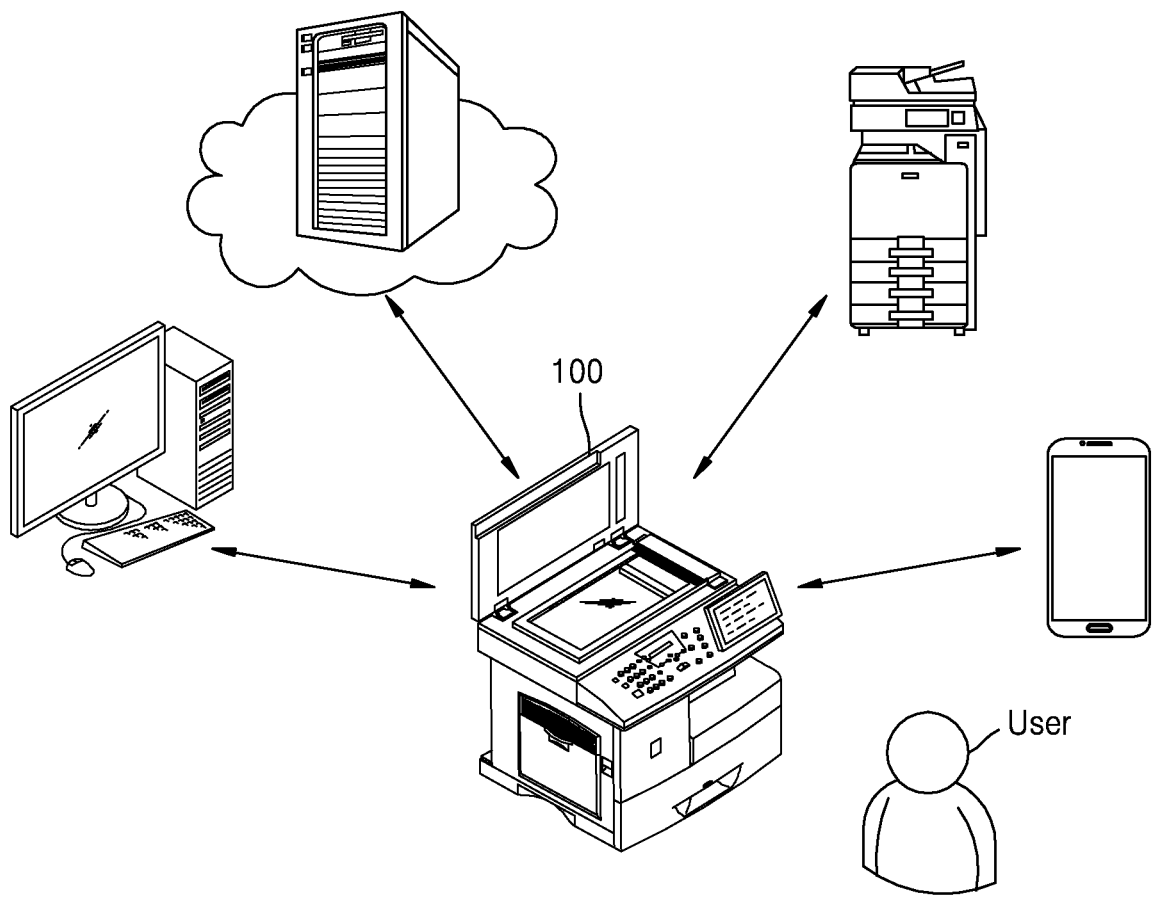
FIG. 1 is a diagram of an image forming job environment of an image forming apparatus including an image forming apparatus and external apparatuses connected to the image forming apparatus, according to an example.

Hereinafter, various examples will be described with reference to the drawings. Like reference numerals in the drawings denote like elements, and thus a repetitive description may be omitted.

FIG. 1 is a diagram of an image forming job environment of an image forming apparatus including an image forming apparatus and external apparatuses connected to the image forming apparatus, according to an example.

Referring to FIG. 1, an image forming apparatus 100 may be a printer, a photocopier, a scanner, a facsimile, a multi-functional machine, or the like, and may perform an image forming job such as printing, copying, scanning, or faxing. Depending on a type of the image forming apparatus 100, the image forming apparatus 100 may form an image on a recording medium such as a printing paper by any of various methods.

The image forming apparatus 100 may be connected to an external device and may transmit or receive information to/from the external device. The external device may be a mobile device, a computer, a Cloud based device, a server, another image forming apparatus, a smartphone, or the like.

A user of the image forming apparatus 100 may access the image forming apparatus 100 and execute functions of the image forming apparatus 100. The user may input user account information to the image forming apparatus 100 to log in and use the image forming apparatus 100. The user may operate the image forming apparatus 100 by editing a document in a user interface screen provided by the image forming apparatus 100 or setting options related to an image forming job.

A document in which the image forming apparatus 100 performs an image forming job may include various types of personal information. Here, the user may want to redact personal information included in the document to prevent the personal information from being exposed. For example, sensitive information such as personal information may be deleted or blocked such that other users may not see or otherwise access the information. Hereinafter, an example of an operation of redacting various types of personal information included in a document by using a user interface screen provided by an image forming apparatus will be described.

Figure 2:
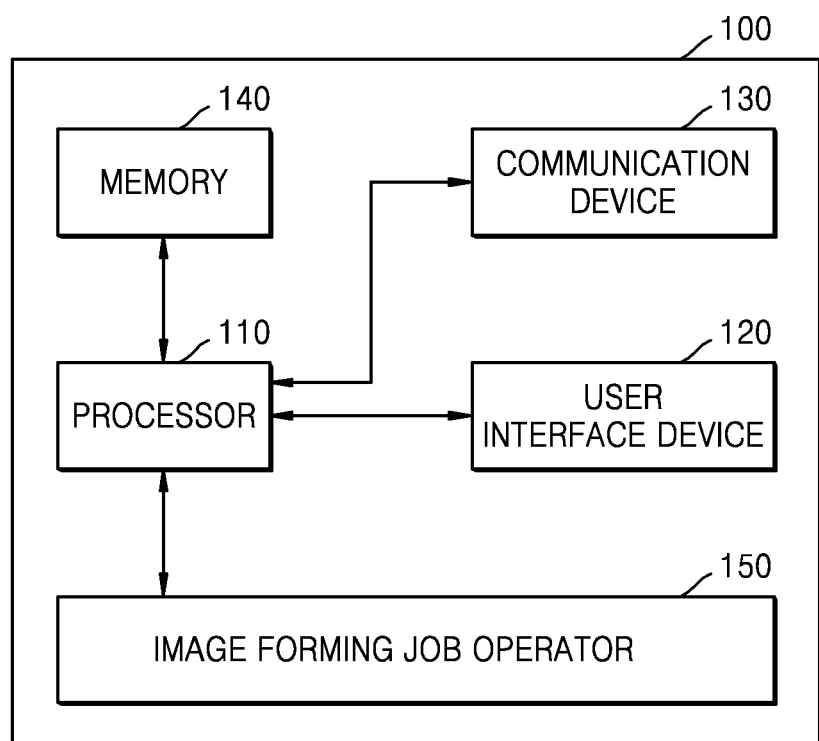
FIG. 2 is a block diagram of an image forming apparatus according to an example.

FIG. 2 is a block diagram of an image forming apparatus according to an example.

Referring to FIG. 2, the image forming apparatus 100 may include a processor 110, a user interface device 120, a communication device 130, a memory 140, and an image forming job operator 150. In addition, although not illustrated in FIG. 2, the image forming apparatus 100 may further include other elements, such as a power supply unit to supply power to the image forming apparatus 100 or to various components of the image forming apparatus 100 (e.g., the processor 110, the user interface device 120, the communication device 130, the memory 140, or the image forming job operator 150).

The processor 110 may control an operation of the image forming apparatus 100 and may include at least one processing unit such as a central processing unit (CPU) or the like. The processor 110 may control other components included in the image forming apparatus 100 to perform an operation corresponding to a user input received through the user interface device 120. The processor 110 may respectively include a specialized processing unit corresponding to each function of the image forming apparatus 100, a single processing unit for processing all functions of the image forming apparatus 100, or a combination thereof. The processor 110 may execute a program stored in the memory 140, read data or files stored in the memory 140, or store new data in the memory 140.

The user interface device 120 may include an input unit and an output unit. In an example, the input unit may receive, from the user, an input for performing an image forming job and the output unit may display a result of performing the image forming job or information of a state of the image forming apparatus 100. For example, the user interface device 120 may be in a form of a touch screen including an operation panel to receive a user input and a display panel to display a screen.

The communication device 130 may perform wired or wireless communication with another device or a network. To this end, the communication device 130 may include a communication module (e.g., a transceiver) supporting at least one of various wired or wireless communication methods. The wireless communication may include, for example, wireless fidelity (Wi-Fi), Wi-Fi direct, Bluetooth, ultra-wideband (UWB), near field communication (NFC), or the like. The wired communication may include, for example, Ethernet, universal serial bus (USB), high definition multimedia interface (HDMI), or the like.

The communication device 130 may be connected to an external device located outside the image forming apparatus 100 to transmit and receive signals or data. The communication device 130 may transmit signals or data received from the external device to the processor 110 or transmit signals or data generated by the processor 110 to the external device.

The memory 140 may store instructions executable by the processor 110. The memory 140 may store programs and files like applications corresponding to each function of the image forming apparatus 100. The memory 140 may store an operating system.

The image forming job operator 150 may perform an image forming job such as printing, copying, scanning, or faxing. The image forming job operator 150 may perform an image forming job according to an instruction received by a user input through the user interface device 120. The image forming job operator 150 may form an image on a recording medium by any of various printing methods such as an electrophotographic method, an inkjet method, a thermal transfer method, a direct thermal method, or the like, according to a printing function. The image forming job operator 150 may read a recorded image by irradiating light onto an original and receiving reflected light, according to a scanning function. The image forming job operator 150 may scan an image and transmit a scan file to a destination or receive a file from an external source and print the received file, according to a faxing function.

The image forming apparatus 100 may use the user interface device 120 to communicate with a user such as by receiving a request from the user or providing certain information to the user. The image forming apparatus 100 may also communicate with the user by use of an external device such as a user terminal through the communication device 130.

The processor 110 may execute instructions stored in the memory 140 to display a preview screen of a document through the user interface device 120 and perform a process of redacting personal information included in the document. The processor 110 may execute instructions stored in the memory 140 to show display state information of the personal information on the preview screen, in synchronization with a progress of the redaction process. The display state information of the personal information may be information designated throughout the document or information summarizing a current state of redacted personal information while the redaction process is being performed. The display state information of the personal information may be adaptively changed in synchronization with whether the personal information is designated and/or redacted throughout the document. The processor 110 may execute instructions stored in the memory 140 to control the image forming job operator 150, when the redaction process is completed, to perform the image forming job with respect to the document in which the personal information is redacted.

The processor 110 may execute instructions stored in the memory 140 to receive, from the user, an input selecting personal information included in the document. In an example, the processor 110 may receive the input through the user interface device 120. The processor 110 may identify a format of the selected personal information and designate additional personal information in the document having a format the same as or similar to that of the identified format. The user may select the personal information on the preview screen of the document that is displayed on the user interface device 120. The processor 110 may identify a format of the personal information selected by the user and identify a format with respect to other information in the document. The processor 110 may compare the formats of the information in the document and designate a corresponding area in the document if the personal information of the corresponding area has the same format as the format of the personal information selected by the user. The processor 110 may perform a highlighted display with respect to the designated personal information throughout the document such that the user may recognize the designated information including the selected personal information. The processor 110 may execute instructions stored in the memory 140 to redact personal information among the designated personal information. For example, the processor 110 may execute instructions stored in the memory 140 to redact at least one piece of personal information selected by the user among the designated personal information.

In an example, the processor 110 may execute instructions stored in the memory 140 to receive a selection, through the user interface device 120, of personal information included in a document, identify a format of the selected personal information, and designate personal information throughout the document having a same character string as that of the selected personal information when the format of the selected personal information cannot be identified. The processor 110 may execute instructions stored in the memory 140 to redact personal information among the designated personal information. For example, the processor 110 may execute instructions stored in the memory 140 to redact at least one piece of personal information selected by the user among the designated personal information.

The processor 110 may execute instructions stored in the memory 140 to provide a menu window in which the personal information may be selected through the user interface device 120 and may designate personal information throughout the document corresponding to a type of the personal information selected in the provided menu window. The processor 110 may execute instructions stored in the memory 140 to redact personal information among the designated personal information. For example, the processor 110 may execute instructions stored in the memory 140 to redact at least one piece of personal information selected by the user among the designated personal information.

In an example, the processor 110 may execute instructions stored in the memory 140 to redact personal information by masking, blurring, or the like a display area corresponding to the personal information. In an example, the processor 110 may execute instructions stored in the memory 140 to edit the display area corresponding to the personal information on the preview screen.

An example operation of an image forming apparatus will now be described. The above-mentioned contents with respect to the image forming apparatus 100 may be applied to an operation method of an image forming apparatus as the same even when the contents are omitted hereinafter. Alternatively, the contents of the operation method of the image forming apparatus may be applied to the image forming apparatus 100 as the same.

Figure 3:
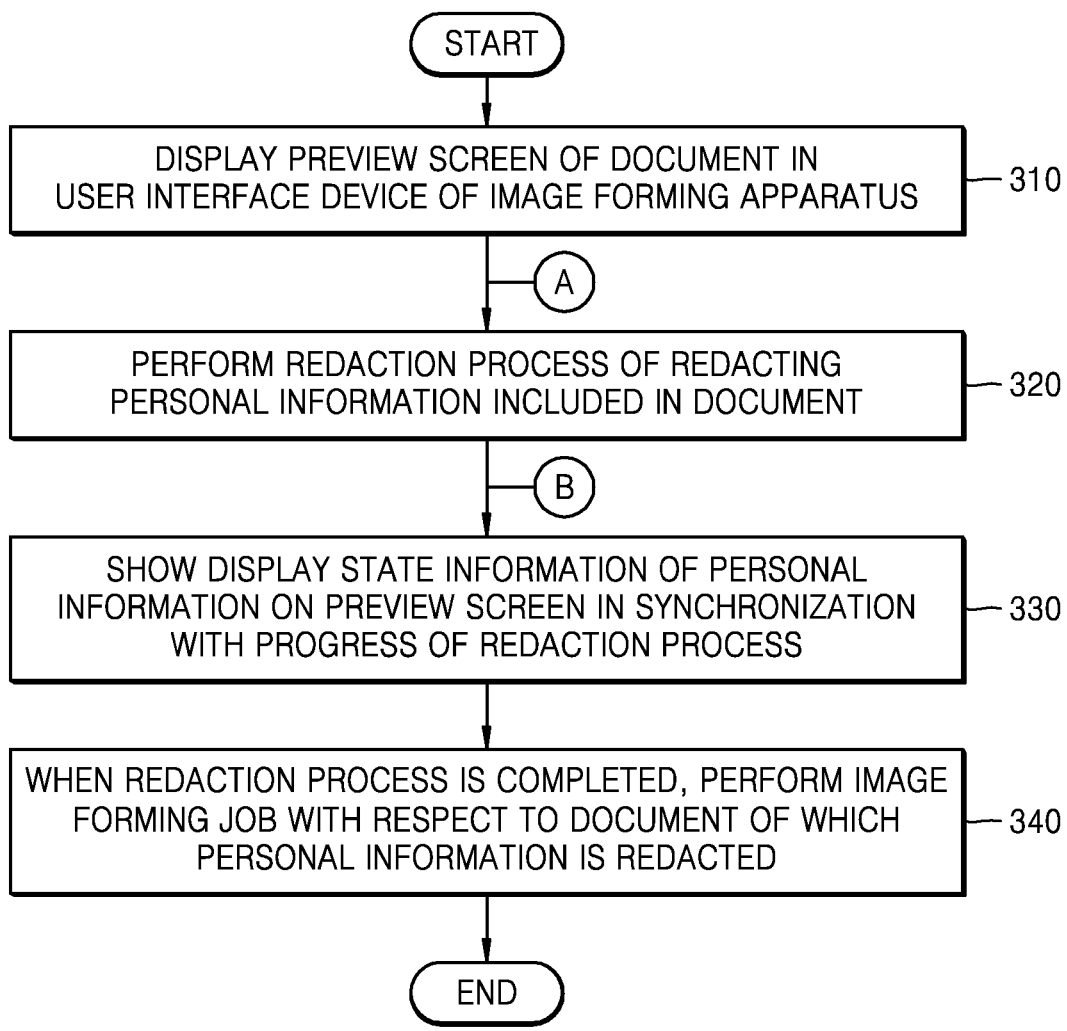
FIG. 3 is a flowchart of an operation method of an image forming apparatus, according to an example.

FIG. 3 is a flowchart of an operation method of an image forming apparatus according to an example.

Referring to FIG. 3, the image forming apparatus 100 may display a preview screen of a document in the user interface device 120 of the image forming apparatus 100 in operation 310. As an example, the image forming apparatus 100 may display a document received from an external source, a scanned document stored in the image forming apparatus 100, or the like on the preview screen.

In operation 320, the image forming apparatus 100 may perform a redaction process of redacting personal information included in the document. The personal information may be information such as a name, a social security number, an e-mail address, a mobile phone number, an address, or the like which identifies a user or private information with respect to a user. The image forming apparatus 100 may designate, in the document, the personal information included in the document through a user's selection or automatic identification. The image forming apparatus 100 may receive the personal information through the user interface device 120 or an external apparatus connected to the image forming apparatus 100. An optical character recognition (OCR) or an intelligent character recognition (ICR) technology may be used to perform automatic identification of personal information.

The image forming apparatus 100 may redact personal information among the designated personal information. For example, the image forming apparatus 100 may redact at least one piece of personal information selected by the user among the designated personal information. For example, the image forming apparatus 100 may redact the personal information by masking, blurring, or the like the display area corresponding to the personal information.

The redaction process may further include an operation of editing the redacted personal information on the preview screen. For example, the user may perform editing by deleting, color changing, position moving, size adjusting, or the like of the display area corresponding to the redacted personal information.

When the personal information is further required to be redacted, the user may redact the personal information by further selecting the personal information through the image forming apparatus 100.

In operation 330, the image forming apparatus 100 may show the display state information of the personal information on the preview screen in synchronization with the progress of the redaction process. The display state information of the personal information may be adaptively changed in synchronization with whether the personal information is designated or redacted. The display state information of the personal information may include a total number of pieces of personal information, a number of pieces of redacted personal information, a number of pieces of personal information that is not redacted, or the like. The display state information of the personal information may further include a number of each type of the personal information.

In operation 340, the image forming apparatus 100 may perform an image forming job with respect to the document of which the personal information is redacted when the redaction process is completed. In a case in which the personal information to be redacted no longer exists or there is a user's termination request with respect to the redaction process, the image forming apparatus 100 may determine that the redaction process is completed. For example, in a case in which all of the personal information is redacted or some personal information is redacted and the remaining personal information is undesignated, or in a case in which all of the personal information is undesignated, the image forming apparatus 100 may determine that no personal information omitting the redaction exists (e.g., that all personal information has been considered for redaction).

When the redaction process is completed, the image forming apparatus 100 may store or print the document from which the personal information is redacted, and may transmit the document to an external apparatus through a service such as e-mail, File Transfer Protocol (FTP), Server Message Block (SMB), or the like. When the image forming job is attempted to be performed before the redaction process is completed, the image forming apparatus 100 may show the personal information which is not redacted to the user and determine again whether to perform the image forming job. When a user's approval is received, the image forming apparatus 100 may perform the image forming job with respect to the personal information omitting the redaction. When a user's approval is not received, the image forming apparatus 100 may display the personal information which is not redacted or otherwise induce the user to redact the personal information.

FIG. 4 is a flowchart illustrating an operation in which an image forming apparatus performs a redaction process of redacting personal information included in a document, according to an example.

Referring to FIG. 4, the image forming apparatus 100 may receive an input selecting personal information included in a document in operation 410. As an example, a user of the image forming apparatus 100 may select the personal information through a preview screen of a document displayed on the user interface device 120 of the image forming apparatus 100.

In operation 420, the image forming apparatus 100 may perform an operation of identifying a format of the selected personal information. As an example, an OCR or an ICR technology may be used to perform identification of the format of the personal information. According to a type of the personal information, the personal information may have a standardized format. For example, personal information such as a social security number, an e-mail address, a phone number (e.g., a mobile phone number), or the like may have a standardized format.

In operation 430, the image forming apparatus 100 may determine whether the format of the selected personal information may be identified. When the image forming apparatus 100 may identify the format of the personal information, operation 440 may be performed. When the image forming apparatus 100 cannot identify the format of the personal information, operation 460 may be performed.

In operation 440, the image forming apparatus 100 may designate, throughout the document, personal information having a same format as that of the identified format. The image forming apparatus 100 may identify the personal information having the same format as that of the personal information selected by the user to designate the personal information having the same format throughout the document. The image forming apparatus 100 may confirm a type and a number of occurrences of the designated personal information.

In operation 450, the image forming apparatus 100 may redact personal information among the designated personal information. For example, the image forming apparatus 100 may redact at least one piece of personal information selected by the user among the designated personal information. In an example, the image forming apparatus 100 may redact the personal information by masking, blurring, or the like the display area corresponding to the personal information.

In operation 460, when the image forming apparatus 100 cannot identify the format of the selected personal information, the image forming apparatus 100 may designate, throughout the document, personal information having a same character string as that of the selected personal information. The image forming apparatus 100 may identify personal information having the same character string as that of the personal information selected by the user to designate the personal information having the same character string as that of the personal information selected by the user throughout the document. The image forming apparatus 100 may confirm a number of occurrences of the designated personal information.

For example, when the selected personal information is in a format that cannot be identified, the image forming apparatus may notify the user that the format of the selected personal information cannot be identified. Further, the image forming apparatus may ask the user whether to search for the personal information having the same character string as that of the selected personal information. When the user approves a search by using the character string of the personal information, the image forming apparatus 100 may register the character string of the personal information corresponding to the input as a custom character string. The image forming apparatus 100 may recognize a corresponding character string registered as the custom character string throughout the document to designate an area corresponding to the corresponding character string and may confirm a designated number.

In operation 470, the image forming apparatus 100 may redact personal information among the designated personal information. For example, the image forming apparatus 100 may redact at least one piece of personal information selected by the user among the designated personal information. The image forming apparatus 100 may redact the personal information by masking, blurring, or the like a display area corresponding to the designated personal information.

In an example, the display area corresponding to the redacted personal information may be edited on the preview screen.

FIGS. 5 to 8 are diagrams for explaining an operation of a user interface screen for managing personal information included in a document according to various examples.

FIG. 5 is a diagram of a user interface screen to receive, from a user, an input selecting personal information included in a document and to show the personal information designated in the document, according to an example.

When the document includes various types of personal information, a user interface managing the personal information may be provided on the preview screen of the document provided by the user interface device 120 of the image forming apparatus 100, as shown in FIG. 5.

Referring to FIG. 5, the image forming apparatus 100 may receive, from the user, an input selecting personal information included in the document on the preview screen. For example, the user may select personal information to be redacted in the document on the preview screen using a tapping method. However, the example is not limited thereto. The image forming apparatus 100 may designate, throughout the document, not only the selected personal information, but also designate personal information having a same format as that of the selected personal information. The image forming apparatus 100 may perform a highlighted-display with respect to the designated personal information. The highlighted-display may be performed on a portion corresponding to the personal information or an input area to which personal information is input, and may be differently displayed according to a type of the personal information.

As shown in FIG. 5, when the user taps the personal information corresponding to a social security number included in the document on the preview screen, the image forming apparatus 100 may designate other personal information having a format of a social security number in the document. In addition, the image forming apparatus 100 may highlight the personal information having a format of a social security number.

When the document includes multiple pieces of personal information, the user may continuously select the personal information. The image forming apparatus 100 may designate the personal information continuously selected by the user throughout the document. In the example of FIG. 5, the image forming apparatus may receive, from the user, an input selecting a name, an address, a social security number, a mobile phone number, or the like to designate a respective corresponding position in the document and show the position with a different highlight according to the type of personal information.

In the example of FIG. 5, the display state information of the personal information is shown at a top of the document displayed on the preview screen. In the illustrated example, the display state information includes "Total(8) Redaction (0) Remains(8)," which indicates that there are a total of eight pieces of information, zero pieces of redacted information, and eight pieces of unredacted information in the document displayed on the preview screen. In addition, "Name(3) Social Security Number(3), Phone(1), Address (1)" indicates that there are respectively three names, three social security numbers, one phone number, and one address in the document displayed on the preview screen. The display state information of the personal information may be adaptively changed in synchronization with whether the personal information is designated and/or redacted throughout the document.

Figure 6:
FIG. 6 is a diagram of a user interface screen in which personal information included in a document is redacted, according to an example.

FIG. 6 is a diagram of a user interface screen in which personal information included in a document is redacted, according to an example.

Referring to FIG. 6, the image forming apparatus 100 may designate personal information included in the document displayed through the user interface device 120 and notify that the uppermost social security number among the designated three social security numbers is redacted. Accordingly, the display state information of the personal information may be displayed as "Total(8) Redaction(1) Remains (7)", which indicates that there are a total of eight pieces of information, one piece of redacted information, and seven pieces of unredacted information.

A management menu for personal information may be provided to redact personal information included in a document. The management menu for personal information may be displayed when the image forming apparatus 100 receives an input selecting personal information included in the document or may always be displayed to the user.

As illustrated in FIG. 6, the image forming apparatus 100 may provide a management menu in a floating menu form for personal information. The management menu in the floating menu form may be popped up for display when the user selects any personal information. As shown in FIG. 6, when the user selects "Joy" which corresponds to a name among the personal information, the image forming apparatus 100 may provide the management menu in the floating menu form for personal information.

Referring to FIG. 6, the management menu for personal information may include a "Redact" button, a "Redact Same type" button, a "Redact All" button, an "Adjust" button, a "Delete" button, a "Delete Same type" button, and a "Delete All" button.

The "Redact" button may be used to redact the personal information. The user may select the "Redact" button after selecting the personal information included in the document to redact the corresponding personal information. The personal information may be displayed highlighted before the "Redact" button is pressed. In various examples, the personal information may be masked, blurred, or the like and converted to be opaque after the "Redact" button is pressed.

The "Redact Same type" button may be used to redact personal information having a same format as that of the selected personal information. The user may press the "Redact Same type" button after selecting the personal information included in the document to redact personal information having a same format as that of the selected personal information.

The "Redact All" button may be used to redact all personal information included in the document. The user may press the "Redact All" button to redact all information designated as personal information by the image forming apparatus 100.

The "Adjust" button may be used to provide an adjustment mode with respect to the personal information. The user may press the "Adjust" button after selecting the personal information included in the document to enter the adjustment mode with respect to the personal information. In an example, the user may adjust an area corresponding to the redacted personal information to a corresponding area in a drag-and-drop method.

The "Delete" button may be used to release the designation of the personal information or release the redaction of the personal information. The user may press the "Delete" button after selecting the personal information that is displayed highlighted and designated to release the designation of the corresponding personal information and remove the highlighted-display. In addition, the user may press the "Delete" button after selecting the redacted personal information to release the redaction of the corresponding personal information and change it to be highlighted as before the redaction.

The "Delete Same type" button may be used to release the redaction with respect to personal information having a same format as that of the personal information selected by the user. The user may press the "Delete Same type" button after selecting the personal information included in the document to release the redaction of personal information having a same format as that of the selected personal information.

The "Delete All" button may be used to release the redaction of all personal information included in the document. The user may press the "Delete All" button to release the redaction of all personal information redacted by the image forming apparatus 100.

FIG. 7 is a diagram of a user interface screen in which personal information included in a document is redacted, according to an example.

Referring to FIG. 7, the image forming apparatus 100 may provide a management menu in a sidebar menu form for personal information. The management menu in the sidebar menu form may always be displayed.

Since a function of each button included in the management menu for personal information shown in FIG. 7 is the same as a function of each button included in the management menu for personal information described in FIG. 6, descriptions with respect to the overlapped contents are omitted for conciseness.

As shown in FIG. 7, when the management menu for personal information is displayed in the sidebar menu form, it is possible to manage the personal information by first pressing a button included in the management menu for personal information and selecting the personal information.

For example, the user may select the personal information included in the document after pressing a "Redact" button to redact the corresponding personal information. The user may select the personal information included in the document after pressing a "Redact Same Type" button to redact personal information having a same format as that of the selected personal information. The user may select the personal information included in the document after pressing an "Adjust" button to enter an adjustment mode with respect to the corresponding personal information. The user may select the personal information included in the document after pressing a "Delete" button to release designation of the corresponding personal information or redaction of the corresponding personal information. The user may select the personal information included in the document after pressing a "Delete Same Type" button to release redaction of personal information having a same format as that of the selected personal information.

FIG. 8 is a diagram of a user interface screen in which redacted personal information is edited, according to an example.

Referring to FIG. 8, an example of editing a display area corresponding to redacted personal information on the preview screen is shown. As illustrated in FIG. 8, the user may press the "Adjust" button in the management menu for personal information after selecting a social security number redacted in the document to enter an adjustment mode with respect to the redacted social security number. The user may drag an area corresponding to the redacted social security number to adjust a redacted area in the adjustment mode. Here, the area corresponding to the social security number may be displayed highlighted for a certain time and thus the user may adjust the redacted area while viewing contents of the redacted social security number.

Figure 9:
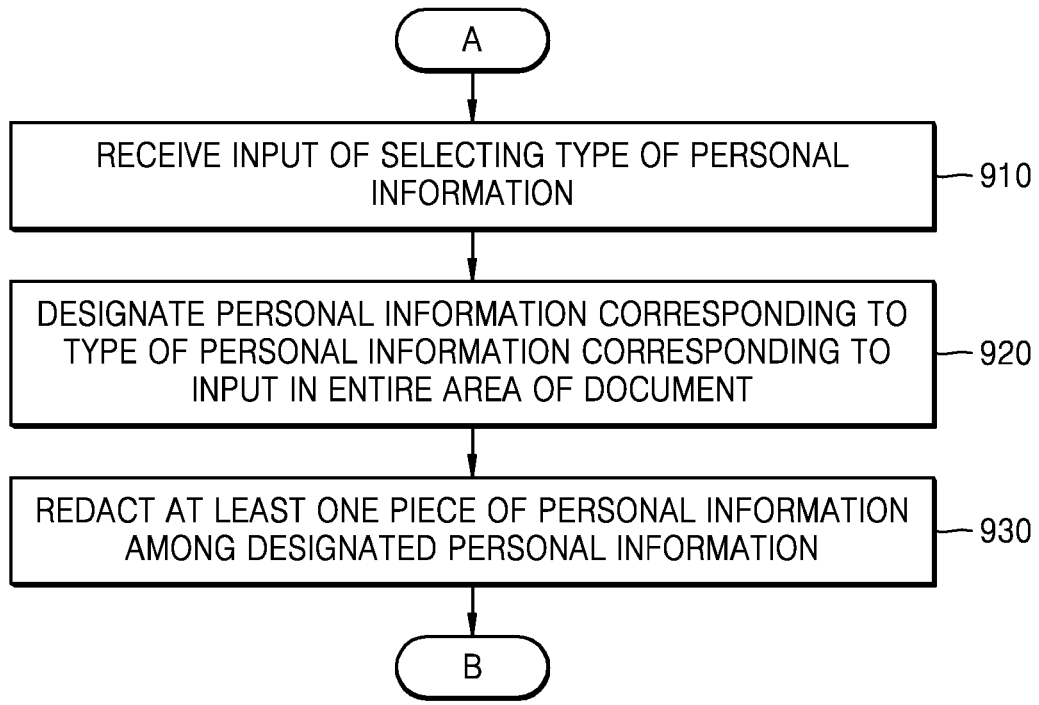
FIG. 9 is a flowchart illustrating an operation in which an image forming apparatus performs a redaction process of redacting personal information included in a document, according to an example.

FIG. 9 is a flowchart illustrating an operation in which an image forming apparatus performs a redaction process of redacting personal information included in a document, according to an example.

Referring to FIG. 9, the image forming apparatus 100 may receive an input selecting a type of personal information included in a document in operation 910. As an example, the image forming apparatus 100 may provide a menu window in which the type of personal information may be selected. The user of the image forming apparatus 100 may select the type of personal information included in the document to be redacted through a preview screen of the document displayed on the user interface device 120 of the image forming apparatus 100. The menu window in which the type of personal information may be selected may display different types of predetermined personal information or may display only the type of personal information included in the document. For example, the image forming apparatus 100 may provide, through the menu window, a list in which the types of personal information such as a name, a social security number, an address, an e-mail address, or the like may be selected and also support the user to select a plurality of types of personal information from the list. In addition, the image forming apparatus 100 may provide a custom character string item in the menu window such that the user may define a particular character string.

In operation 920, the image forming apparatus 100 may designate, throughout the document, personal information corresponding to the type of selected personal information. When there is a character string defined, by the user, as the custom character string, the image forming apparatus 100 may designate the corresponding character string throughout the document. The image forming apparatus 100 may determine the type and number of the designated personal information or a number of occurrences of the character string throughout the document.

In operation 930, the image forming apparatus 100 may redact personal information among the designated personal information. For example, the image forming apparatus 100 may redact at least one piece of personal information selected by the user among the designated personal information.

Figure 10:
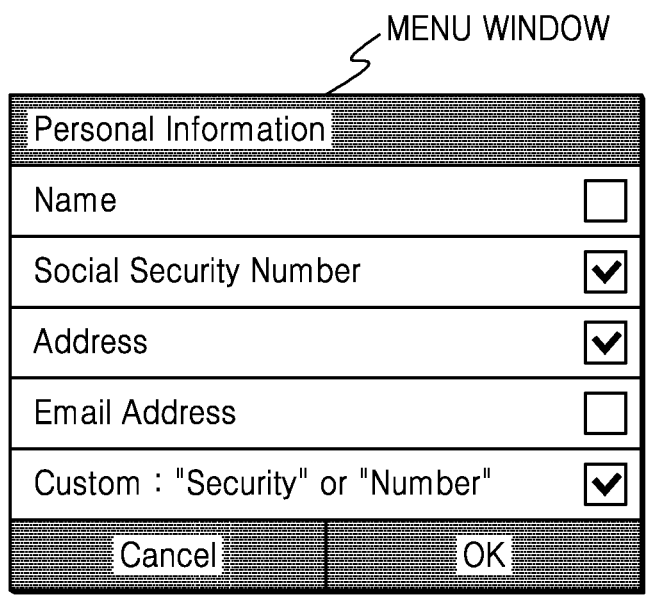
FIG. 10 is a diagram of a menu window in which a type of personal information to be designated in a document may be selected in an image forming apparatus, according to an example.

FIG. 10 is a diagram of a menu window in which a type of personal information to be designated in a document may be selected in an image forming apparatus, according to an example.

Referring to FIG. 10, an example of a menu window in which a type of personal information may be selected is illustrated. As shown in FIG. 10, the menu window in which the type of personal information may be selected provides a selectable list including a name, a social security number, an address, an e-mail address, and a custom character string. Referring to FIG. 10, when "Security" or "Number" is defined as the custom character string, the image forming apparatus 100 may designate, in the document, a position where the corresponding character string exists. The user may select at least one type of personal information from the selectable list provided in the menu window. As shown in FIG. 10, the user may simultaneously select a plurality of types of personal information from the menu window.

In a case in which other areas of the document do not include the personal information, modifications of the corresponding areas may be set to be non-modifiable when necessary. As an example, a predetermined area of the document may be set to be modifiable and the other areas may be set to be non-modifiable. In various examples as shown in FIGS. 11 and 12, a user interface screen to set a modifiable area and a non-modifiable area in a document may be provided.

Figure 11:
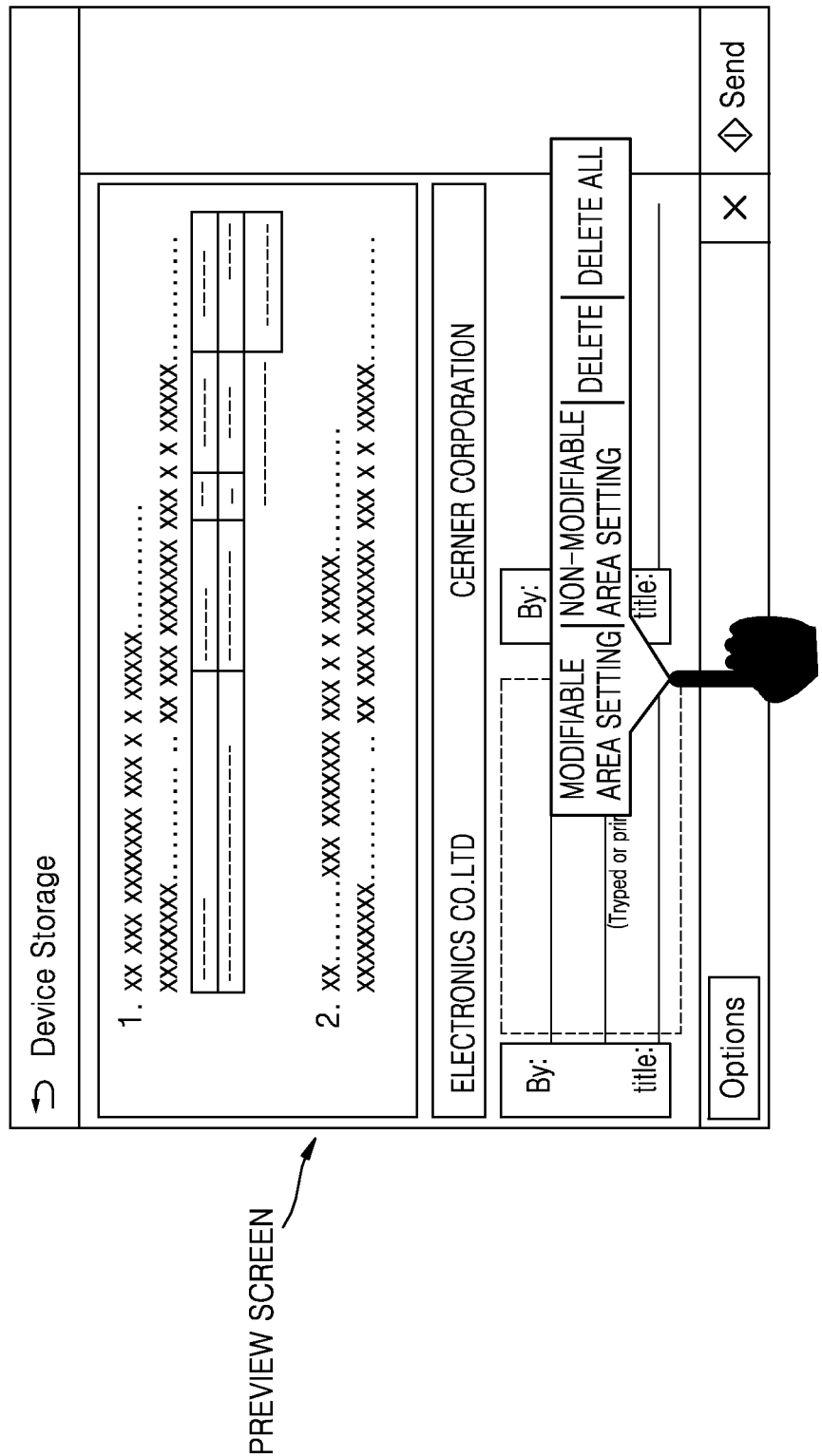
FIG. 11 is a diagram of a user interface screen in which a modifiable area and a non-modifiable area are set in a document, according to an example.
Figure 12:
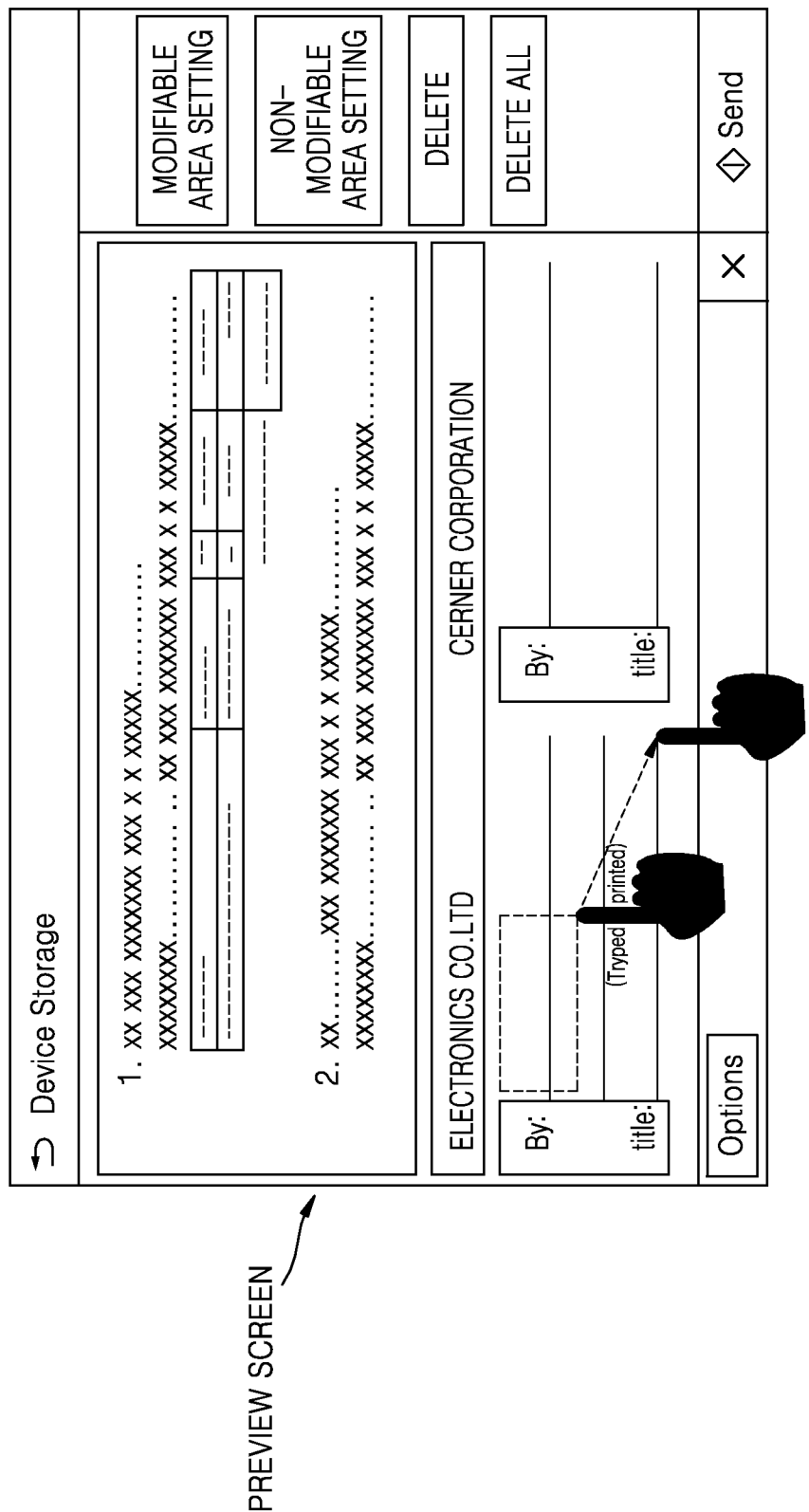
FIG. 12 is a diagram of a user interface screen in which a modifiable area and a non-modifiable area are set in a document, according to an example.

FIG. 11 is a diagram of a user interface screen in which a modifiable area and a non-modifiable area are set in a document, according to an example. FIG. 12 is a diagram of a user interface screen in which a modifiable area and a non-modifiable area are set in a document, according to an example Referring to FIG. 11 and FIG. 12, the user may select any area in the document on a preview screen by a drag-and-drop method and respectively set an area in the document as a modifiable area or a non-modifiable area by using a "modifiable area setting" button and a "non-modifiable area setting" button. A "Delete" button may be used to delete a selected area and a "Delete All" button may be used to delete all selected areas.

Figure 13:
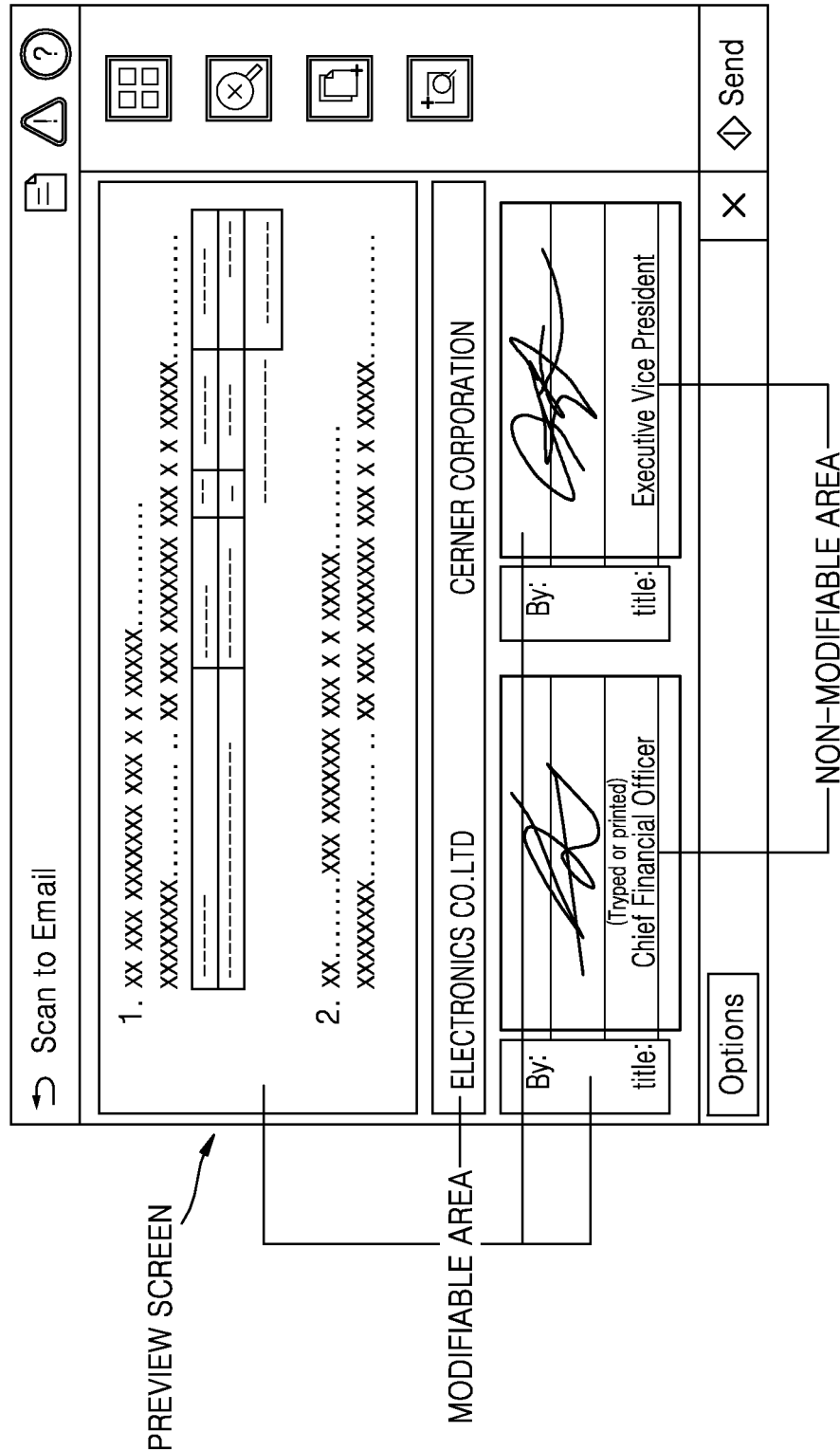
FIG. 13 is a diagram of a document in a modification preventing format in which a modifiable area and a non-modifiable area are set, according to an example.

FIG. 13 is a diagram of a document in a modification preventing format in which a modifiable area and a non-modifiable area are set, according to an example.

Referring to FIG. 13, the image forming apparatus 100 may determine whether a document to be displayed on a preview screen through the user interface device 120 is a document in a pre-registered modification preventing format to display, on the preview screen, a document to which the modification preventing format is applied. In an example, the modifiable area and the non-modifiable area in the document may be displayed in different colors.

When an attempt is made to redact or modify the non-modifiable area in the document displayed on the preview screen, the image forming apparatus 100 may notify the user that the area is a non-modifiable area and may not allow the non-modifiable area to be modified. On the other hand, when an attempt is made to redact or modify the modifiable area in the document displayed on the preview screen, the image forming apparatus 100 may display a modification result with respect to the corresponding area to the user and allow the modifiable area to be modified.

The above-mentioned examples may be implemented in the form of a non-transitory computer-readable medium storing instructions or data executable by a computer or a processor. The examples may be written as computer programs and may be implemented in general-use digital computers that execute the programs by using a computer-readable storage medium. Examples of the non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disk, solid-status disk (SSD), and instructions or software, associated data, data files, and data structures, and any device capable of providing instructions or software, associated data, data files, and data structures to a processor or a computer such that the processor computer may execute instructions.

What is claimed is:
1. An image forming apparatus comprising:
   a user interface device;
   an image forming job operator;
   a processor; and
   a memory storing instructions executable by the processor,
   wherein the processor executes the instructions to:
      receive an input to select personal information included in a document and perform a redaction process of redacting the personal information displayed on a preview screen of the document through the user interface device and included in the document,
      designate, throughout the document, personal information having the same string of characters as a character string of the personal information corresponding to the input in response to a format of the personal information corresponding to the input not being identified,
      redact at least one piece of personal information among the designated personal information,
      show display state information of the personal information in synchronization with a progress of the redaction process, the display state information summarizing a current state of redacted personal information, and control the image forming job operator to perform an image forming job with respect to the document in which the personal information is redacted based on completing the redaction process.

2. The image forming apparatus of claim 1, wherein the display state information of the personal information is adaptively changed in synchronization with whether the personal information is designated or redacted throughout the document.

3. The image forming apparatus of claim 1, wherein the processor executes the instructions to:

identify a format of personal information corresponding to the input to designate, throughout the document, personal information having the same format as the identified format and redact personal information among the designated information.

4. The image forming apparatus of claim 1, wherein the processor executes the instructions to:

receive an input selecting a type of personal information,
designate, throughout the document, personal information corresponding to a type of personal information corresponding to the input, and
redact at least one piece of personal information among the designated personal information.

5. The image forming apparatus of claim 1, wherein the processor executes the instructions to mask or blur a display area corresponding to the personal information to redact the personal information.

6. The image forming apparatus of claim 1, wherein the processor executes the instructions to edit a display area corresponding to the redacted personal information on the preview screen.

7. An operation method of an image forming apparatus, the method comprising:

displaying a preview screen of a document in a user interface device of an image forming apparatus;
performing a redaction process of redacting personal information included in the document;
showing display state information of the personal information on the preview screen in synchronization with a progress of the redaction process, the display state information summarizing a current state of redacted personal information; and
based on completing the redaction process, performing an image forming job with respect to the document in which the personal information is redacted,
wherein the performing of the redaction process comprises:
receiving an input to select personal information included in the document;
identifying a format of the personal information corresponding to the input;
designating, throughout the document, personal information having a same character string as a character string of the personal information corresponding to the input in response to the format of the personal information corresponding to the input not being identified; and
redacting at least one piece of personal information among the designated personal information.

8. The method of claim 7, wherein the display state information of the personal information is adaptively changed in synchronization with whether the personal information is designated or redacted throughout the document.

9. The method of claim 7, wherein the performing of the redaction process comprises:

designating, throughout the document, personal information having a same format as the identified format; and
redacting at least one piece of personal information among the designated personal information.

10. The method of claim 7, wherein the performing of the redaction process comprises:

receiving an input selecting a type of personal information;
designating, throughout the document, personal information corresponding to a type of personal information corresponding to the input; and
redacting at least one piece of personal information among the designated personal information.

11. The method of claim 7, wherein the performing of the redaction process comprises masking or blurring a display area corresponding to the personal information to redact the personal information.

12. The method of claim 7, wherein the performing of the redaction process further comprises editing a display area corresponding to the redacted personal information on the preview screen.

13. A non-transitory computer-readable storage medium storing instructions executable by a processor, the non-transitory computer-readable storage medium comprising:

instructions to display a preview screen of a document in a user interface device of an image forming apparatus;
instructions to perform a redaction process of redacting personal information included in the document;
instructions to show display state information of the personal information on the preview screen in synchronization with a progress of the redaction process, the display state information summarizing a current state of redacted personal information; and
instructions to perform an image forming job with respect to the document in which the personal information is redacted based on completing the redaction process,
wherein the instructions to perform a redaction process comprise:
instructions to receive an input to select personal information included in the document;
instructions to identify a format of the personal information corresponding to the input;
instructions to designate, throughout the document, personal information having a same character string as a character string of the personal information corresponding to the input in response to the format of the personal information corresponding to the input not being identified; and
instructions to redact at least one piece of personal information among the designated personal information.

14. The image forming apparatus of claim 1, wherein the display state information of the personal information includes at least one of a total number of pieces of the personal information, a number of pieces of the redacted personal information, a number of pieces of the personal information that is not redacted, or a number of each type of the personal information.

15. The method of claim 7, wherein the display state information of the personal information includes at least one of a total number of pieces of the personal information, a number of pieces of the redacted personal information, a number of pieces of the personal information that is not redacted, or a number of each type of the personal information.

16. The non-transitory computer-readable storage medium of claim 13, wherein the display state information of the personal information includes at least one of a total number of pieces of the personal information, a number of pieces of the redacted personal information, a number of pieces of the personal information that is not redacted, or a number of each type of the personal information.

\* \* \* \* \*